United States Patent
Kalil et al.

(10) Patent No.: US 11,720,565 B2
(45) Date of Patent: Aug. 8, 2023

(54) AUTOMATED QUERY PREDICATE SELECTIVITY PREDICTION USING MACHINE LEARNING MODELS

(71) Applicant: INTERNATIONAL BUSINESS MACHINES CORPORATION, Armonk, NY (US)

(72) Inventors: Mohamad F. Kalil, Ottawa (CA); Calisto Zuzarte, Pickering (CA); Mustafa Dawoud, London (CA); Mohammed Fahd Alhamid, North York (CA); Vincent Corvinelli, Mississauga (CA); Wai Keat Tan, Vancouver (CA); Ronghao Yang, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 17/004,225

(22) Filed: Aug. 27, 2020

(65) Prior Publication Data

US 2022/0067045 A1 Mar. 3, 2022

(51) Int. Cl.
G06F 16/2453 (2019.01)

(52) U.S. Cl.
CPC .. *G06F 16/24545* (2019.01); *G06F 16/24537* (2019.01); *G06F 16/24544* (2019.01)

(58) Field of Classification Search
CPC ......... G06F 16/24545; G06F 16/24537; G06F 16/24544

See application file for complete search history.

(56) References Cited

U.S. PATENT DOCUMENTS

| | | | |
|---|---|---|---|
| 5,995,957 A | 11/1999 | Beavin | |
| 6,272,487 B1 | 8/2001 | Beavin | |
| 6,353,818 B1 | 3/2002 | Carino, Jr. | |
| 6,738,755 B1 | 5/2004 | Freytag | |
| 8,099,410 B2 | 1/2012 | Day | |
| 10,318,866 B2 | 6/2019 | Corvinelli | |
| 2002/0198867 A1 | 12/2002 | Lohman | |
| 2004/0128287 A1* | 7/2004 | Keller | G06F 16/24545 |
| 2004/0181521 A1 | 9/2004 | Simmen | |
| 2008/0046455 A1* | 2/2008 | Behm | G06F 16/24539 707/999.102 |
| 2008/0306903 A1 | 12/2008 | Larson | |

(Continued)

OTHER PUBLICATIONS

Boulos et al., "A Neural Networks Approach for Query Cost Evaluation", 2001, Transactions in Information Processing Society of Japan 38, 17 pages.

(Continued)

*Primary Examiner* — Van H Oberly
(74) *Attorney, Agent, or Firm* — Anthony R. Curro

(57) ABSTRACT

A method, a computer system, and a computer program product for cardinality estimation is provided. Embodiments of the present invention includes accessing database relations. The database relations are utilized to collect a random sample from each of the database relations. Training data is then generated from the random sample. The training data is used to build a cumulative frequency function (CFF) model. The cumulative frequency function (CFF) model then provides a cardinality estimation for an output for SQL operators.

26 Claims, 6 Drawing Sheets

(56) References Cited

U.S. PATENT DOCUMENTS

| | | | |
|---|---|---|---|
| 2015/0149438 A1* | 5/2015 | DeHaan | G06F 16/2453 707/718 |
| 2016/0260011 A1 | 9/2016 | Corvinelli | |
| 2018/0157978 A1 | 6/2018 | Buda | |
| 2018/0174048 A1 | 6/2018 | Corvinelli | |
| 2018/0329951 A1 | 11/2018 | Yu | |
| 2019/0303475 A1 | 10/2019 | Jindal | |
| 2021/0056108 A1* | 2/2021 | Shmueli | G06N 3/08 |

OTHER PUBLICATIONS

Boulos et al., "Cost Estimation of User-Defined Methods in Object-Relational Database Systems", SIGMOD Record, vol. 28, No. 3, Sep. 1999, pp. 22-28.

Chaudhuri et al., "Optimization of Queries with User-defined Predicates", ACM Transactions on Database Systems, vol. 24, No. 2, Jun. 1999, pp. 177-228.

Corvinelli et al., "get the most out of Db2 optimizer: Leveraging statistical views to improve query execution performance", Published on May 2, 2013, https://www.ibm.com/developerworks/data/library/techarticle/dm-1305leverage/, 30 pages, Accessed on Mar. 31, 2020.

He et al., "Self-Tuning Cost Modeling of User-Defined Functions in an Object-Relational DBMS" Sep. 2005, http://www.cems.uvm.edu/~bslee/homepage/papers/STM_UDFCost_TR.pdf, 38 pages.

He et al., "Self-tuning UDF Cost Modeling Using the Memory-Limited Quadtree", 2004, Advances in Database Technology-EDBT 2004, 6 pages.

Huang et al., "Cumulative distribution networks and the derivative-sum-product algorithm", Conference Paper ? Jan. 2008, Conference: UAI 2008, Proceedings of the 24th Conference in Uncertainty in Artificial Intelligence, Helsinki, Finland, Jul. 9-12, 2008, 9 pages.

Ivanov et al., "Adaptive Cardinality Estimation", arXiv:1711.08330v1 [cs.DB] Nov. 22, 2017, 12 pages.

Kipf et al., "Learned Cardinalities: Estimating Correlated Joins with Deep Learning", arXiv: 1809.00677v2 [cs.DB] Dec. 18, 2018, 8 pages.

Magdon-Ismail et al., "Neural Networks for Density Estimation," Nov. 1999, 8 pages.

Marcus et al., "Neo: A Learned Query Optimizer," arXiv:1904.03711 v1 [cs.DB] Apr. 7, 2019, 18 pages.

Ortiz et al., "An Empirical Analysis of Deep Learning for Cardinality Estimation," arXiv:1905.06425v2 [cs.DB] Sep. 12, 2019, 17 pages.

Woltmann et al., "Cardinality Estimation with Local Deep Learning Models", © 2019 Association for Computing Machinery, Rightslink, 8 pages.

Yang et al., "Deep Unsupervised Cardinality Estimation", arXiv:1905.04278v2 [cs.DB] Nov. 21, 2019, 14 pages.

Zhang et al., "Statistical Learning Techniques for Costing XML Queries" Proceedings of the 31st VLDB Conference, Trondheim, Norway, 2005, http://www.vldb2005.org/program/paper/wed/p289-zhang.pdf, pp. 289-300.

Zuzarte, "Improving Performance in Your Data Warehouse—Part 1", https://www.idug.org/p/bl/et/blogid=278&blogaid=779, Accessed on Mar. 27, 2020, I D U G, Leading the Db2 User Community since 1988, 11 pages.

Mell et al., "The NIST Definition of Cloud Computing", Recommendations of the National Institute of Standards and Technology, Special Publication 800-145, Sep. 2011, 7 pages.

IBM, "Db2 Machine Learning Optimizer Technology Preview," IBM.com, Jun. 4, 2020, 13 pgs., <https://www.ibm.com/support/pages/db2-machine-learning-optimizer-technology-preview>.

International Searching Authority, "Written Opinion of the International Searching Authority," Patent Cooperation Treaty, Nov. 19, 2021, 10 pgs., International Application No. PCT/IB2021/057102.

Zuarte, "Exploiting Machine Learning in Db2 Optimization," IBM, Jun. 4, 2019, IDUG Tech Conference, Charlotte, NC, Jun. 2-6, 2019, 29 pgs.

Zuarte, et al., "The Future of Database Query Optimization Using Machine Learning," IBM, Slide Presentation to IBM Customers, Sep. 26, 2019, 31 pgs.

* cited by examiner

AUTOMATED QUERY PREDICATE SELECTIVITY PREDICTION USING MACHINE LEARNING MODELS

BACKGROUND

The present invention relates generally to the field of computing, and more particularly to query predicate selectivity using machine learning. Query optimization is a feature that is efficient in executing a query by creating a management system in a relational database.

Structured query language (SQL) is a programming language created and designed to manage the data stored in a relational database. Structured query language (SQL) can include specific programming language that is used to manage data that is stored in a relational database management system (RDBMS).

A relational database management system (RDBMS) may typically include single column statistics that are usually collected on individual columns in a relation. A relation may include tuples or attributes that describe the relationships or the defining features in the table or a relationship between tables. For example, a relation includes data values on a table and the relational database may store the data values as relations or tables. A collection of relations or tables may be stored on a database as a relational model.

A relational model may be based on a predicate logic that may include conditions to be applied to the table or the relation. In a relational model, predicates may be assumed to be independent when computing the cardinality if the statistics on multiple columns in the table are not collected. Predicates may be typically represented in a form of ranges that require lower and upper bounds. The BETWEEN and range predicates may be formed into a separated range of values for each predicate. Equality predicates may have the lower and upper bounds to be equal. This may provide some improvement in cardinality estimation, however, the computational power to achieve an improved cardinality estimation is extensive, costly and time intensive.

The cardinality estimation plays an important role in structured query language (SQL) optimization. Cardinality as it relates to structured query language (SQL) refers to the number of rows being processed by various operators in a query execution plan. The number of rows coming into an operator may be reduced or increased as the number of rows is processed by different operators until the final result is returned to the application or returned to the user that issued the query. This is distinct from column cardinality. Column cardinality is a statistic that refers to a number of distinct values in a column of a database table. A scan of the database table may have predicates applied that read all of the rows in the table, however, the output may only include rows that qualify the predicate condition. Cardinality estimation is a prediction of how many rows qualify the condition versus how many rows were input into the scan operator.

Cost-based optimizers may rely on cardinality estimation to compute access plans execution costs and to select an optimal access plan. A cost-based optimizer may use statistics based on table data values in a database table to identify an efficient plan for query execution for a structured query. Thus, the accuracy of the cardinality of a structured query can have an effect on the cost-based optimizers. The accuracy of cardinality contributes to an overall goal of selecting the best execution plan through the cardinality estimates. The accuracy of a cardinality estimation may be difficult, or the information required to make the process easier is expensive to collect, or both. The accuracy of cardinality is particularly difficult to achieve on tables that have correlated or skewed columns. An inaccurate cardinality estimation can lead to choosing slow access plans and unpredictable query performance.

SUMMARY

The exemplary embodiments disclose a method, a computer system, and a computer program product for cardinality estimation. In one aspect of the exemplary embodiments, the present invention includes accessing database relations. The database relations are utilized to collect a random sample from each of the database relations. Training data is then generated from the random sample. The training data is used to build a cumulative frequency function (CFF) model. The cumulative frequency function (CFF) model then provides a cardinality estimation for an output for SQL operators.

In another aspect of the exemplary embodiments, the method, computer system and program product include extending the cumulative frequency function (CFF) model to predict a cardinality estimation of SQL operators that are equality predicates In another aspect of the exemplary embodiments, the method, computer system and program product include extending the cumulative frequency function (CFF) model to predict a cardinality estimation of join operators.

In another aspect of the exemplary embodiments, the method, computer system and program product include extending the cumulative frequency function (CFF) model to predict a cardinality estimation of lossless join operators.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
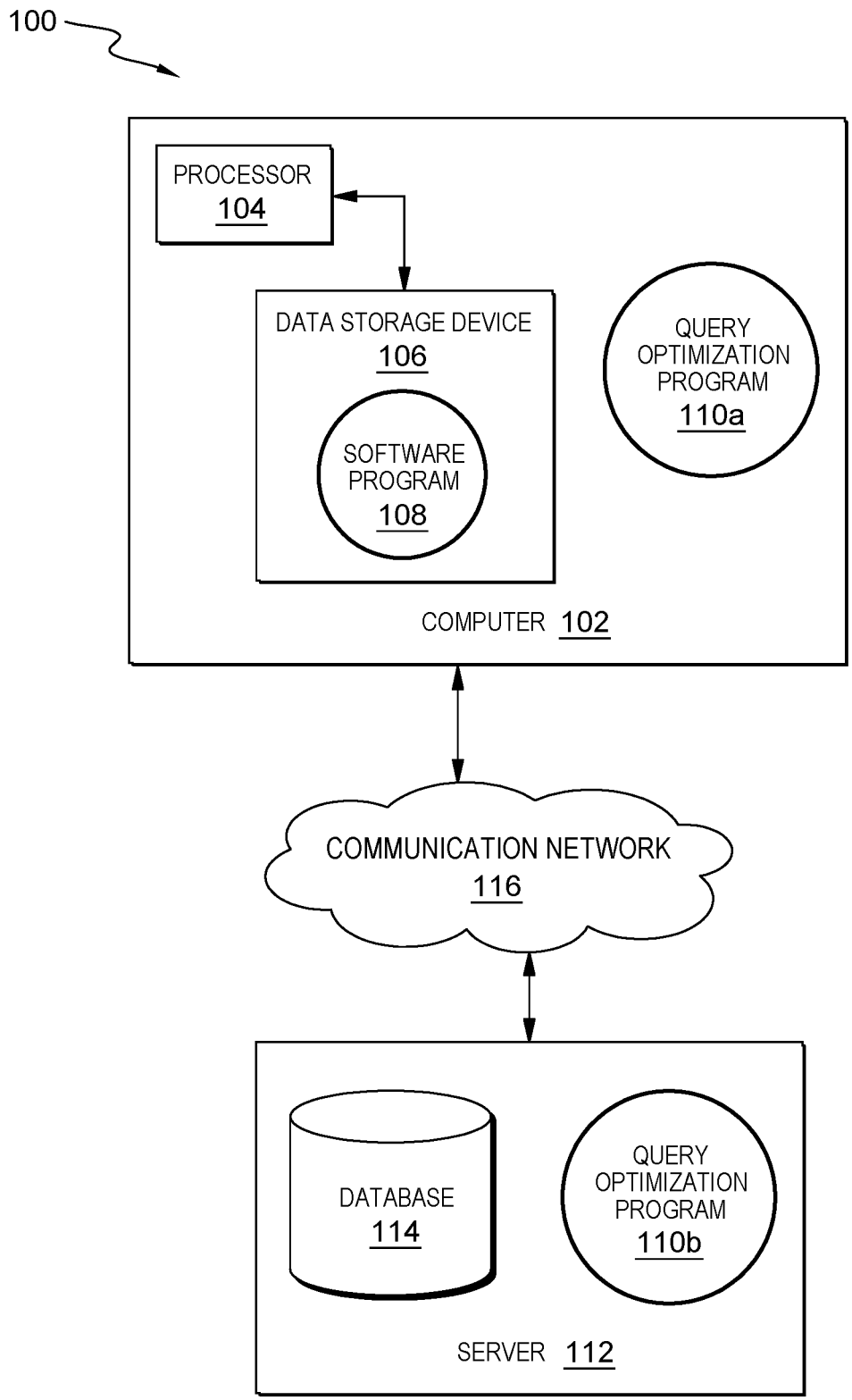
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, query optimization is a feature that is efficient in executing a query by creating a management system in a relational database. Structured query language (SQL) is a programming language created and designed to manage the data stored in a relational database. Structured query language (SQL) can include specific programming language that is used to manage data that is stored in a relational database management system (RDBMS).

A relational database management system (RDBMS) may typically include single column statistics that are usually collected on individual columns in a relation. A relation may include tuples or attributes that describe the relationships or the defining features in the table or a relationship between tables. For example, a relation includes data values on a table and the relational database may store the data values as relations or tables. A collection of relations or tables may be stored on a database as a relational model.

A relational model may be based on a predicate logic that may include conditions to be applied to the table or the relation. In a relational model, predicates may be assumed to be independent when computing the cardinality if the statistics on multiple columns in the table are not collected. Predicates may be typically represented in a form of ranges that require lower and upper bounds. The BETWEEN and range predicates may be formed into a separated range of values for each predicate. Equality predicates may have the lower and upper bounds to be equal. This may provide an improvement in cardinality estimation, however, the computational power to achieve an improved cardinality estimation is extensive, costly and time intensive.

The accuracy of cardinality estimation plays an important role in structured query language (SQL) optimization. The cardinality estimation plays an important role in structured query language (SQL) optimization. Cardinality as it relates to structured query language (SQL) refers to the number of rows being processed by various operators in a query execution plan. The number of rows coming into an operator may be reduced or increased as the number of rows is processed by different operators until the final result is returned to the application or returned to the user that issued the query. This is distinct from column cardinality. Column cardinality is a statistic that refers to a number of distinct values in a column of a database table. A scan of the database table may have predicates applied that read all of the rows in the table, however, the output may only include rows that qualify the predicate condition. Cardinality estimation is a prediction of how many rows qualify the condition versus how many rows were input into the scan operator.

Cost-based optimizers may rely on cardinality estimation to compute access plans execution costs and to select an optimal access plan. A cost-based optimizer may use statistics based on table data values in a database table to identify an efficient plan for query execution for a structured query. Thus, the accuracy of the cardinality of a structured query can have an effect on the cost-based optimizers. The accuracy of cardinality contributes to an overall goal of selecting the best execution plan through the cardinality estimates.

The accuracy of a cardinality estimation may be difficult, or the information required to make the process easier is expensive to collect, or both. The accuracy of cardinality is particularly difficult to achieve on tables that have correlated or skewed columns. An inaccurate cardinality estimation can lead to choosing slow access plans and unpredictable query performance. Therefore, it may be advantageous to, among other things, create a system that leverages machine learning to predict more accurate cardinality estimates.

The following described exemplary embodiments provide a system, a method and a program product for machine learning and cardinality estimation. As such, embodiments of the present invention have the capacity to improve the technical field of machine learning and query optimization by creating a machine learning model to learn and predict or to approximate a multivariate cumulative frequency function (CFF) of relations that will assist in estimating cardinality for all relational operators. More specifically, a cumulative frequency function (CFF) model is created to learn the distribution of data in a relation and the learned distribution of data can be used by the model to accurately estimate the cardinality or predict the selectivity for query predicates.

Cardinality of a table is the number of rows or a stream of rows being processed by an operator in a database. Queries may generally apply predicates on tables to get rows of interest. These predicates may involve various relational comparison operators, for example, age=20 and height>=6 are predicates on the age column and the height column. The selectivity of a predicate is the percentage of rows that a query selects after applying the predicate. Cardinality estimation in the context of predicate filtering is estimating the number of rows after applying the predicates relative to the number of rows before the predicates were applied.

Columns may be statistically correlated, and the statistical correlation of the columns may result in the selectivity of the combined predicates replacing the typical independency assumption. The typical independency assumption may use the product of the individual selectivities. A selectivity may include a statistical analysis or a calculated formula that uses a cardinality value collected from a database table or indexes. Multiple column indexes may be useful to provide statistical correlation information but defining many indexes for statistical correlation creates a higher cost to maintaining the indexes. Collecting data on multiple column statistics can avoid an estimation error of multiple predicates, however, deciding which column combinations to collect may be difficult and expensive to collect and store. For example, assume a relation with N correlated columns, the number of multiple column statistics that covers all of the columns combinations is $2^N$. As the number of column combinations becomes a large number, a relational database management system (RDBMS) may rely on user input to determine which column groups to collect statistics from. Relying on a user for input may not be realistic due to the high skill level that would be required of the user and the level of in-depth knowledge of the data distribution and additionally, the statistical correlation factors between multiple columns would be required.

According to an embodiment, cumulative frequency functions (CFFs) or cumulative distribution functions (CDFs) may be used to estimate the selectivity of predicates applied in a table, applied in index scans or for other filtering operations. Cumulative frequency may include a statistical analysis to identify or calculate queries selectivity when each column is greater than or less than or equal to a particular or predetermined value. Cumulative frequency functions (CFFs) may describe a function that identifies the probability that a value is, for example, less than or equal to a particular value. A multivariate cumulative frequency function (CFF) may include an identification of a probability function that covers values in two or more columns.

Machine learning may be used to approximate the multivariate cumulative frequency function (CFF) of relations. Various types of machine learning models may be built and used to create predictive analytics and results for the cumulative frequency function (CFF). Models may include, for example, deep learning models, neural networks, artificial neural networks (ANNs) and regression models. Deep learning may also be related to or known as hierarchical learning or deep structured learning. The term model may be used to indicate various types of machine learning models, such as a deep learning model, a neural network model, a trained model, an attention-based model, a classification model, a regression model or a decision tree model. A Regression model may be used to analyze and calculate statistics and data trends or to quantify relationships or connections between data. A deep learning model may be used, for example, to learn the cumulative frequency function (CFF) for the purpose of predicting or providing an output that may include a cardinality estimation.

Training and updating a model may include supervised, unsupervised and semi-supervised machine learning procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

Deep learning is a type of machine learning that may classify information based on the input data or training data. Input data may consist of structured data or unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content.

According to an embodiment, a cumulative frequency function (CFF) model may be created or generated using inequality predicates, for example, predicates with an $\leq$ operator. Other types of predicates will be provided as alternate embodiments. According to an alternate embodiment, the functionality of the built cumulative frequency function (CFF) model may be extended for estimating the cardinality of additional SQL predicate comparison operators, such as equality, BETWEEN, or strict inequality (i.e., greater than or less than).

According to an alternate embodiment, the built cumulative frequency function (CFF) model that is built using $\leq$ may be extended for estimating the cardinality of SQL predicates or SQL operators with more complex predicates, such as IN, OR and NOT predicates. Additional complex predicates may also be considered in combination with multiple basic and complex predicates using the same built cumulative frequency function (CFF) model.

According to an alternate embodiment, the built cumulative frequency function (CFF) model may be extended to estimating the cardinality of joins. Typically, modern database systems rely on simplifying the computation of join distributions across tables using assumptions when computing the join cardinality. Three examples of assumptions that are often used when there are no statistics to identify correlations between predicates may include independency, uniformity and inclusion.

The independence assumption may treat multiple predicate column values to be independent and the combined selectivity is the product of the individual predicate selectivity. The uniformity assumptions may ignore or skew statistical information when computing join result selectivity. The inclusion assumption simplifies computations of the join predicate selectivity when it assumes that all distinct values in a column of fewer distinct values exist in the other table's join column that contains a higher number of distinct values. One direct application of the cumulative frequency function (CFF) includes building a model using the join columns. Here, predicates applied to used columns not involved in a join may be evaluated to obtain information about the join column(s) to assist with join cardinality estimation.

According to an alternate embodiment, the built cumulative frequency function (CFF) model may include estimating the cardinality to be extended to lossless joins or lossless join predicates. For instance, if the join between the fact and a set of dimension relations is lossless, then a model may be built on the join of fact table with all dimension tables.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a query optimization program 110*a*. The networked computer environment 100 may also include a server 112 that is enabled to run a query optimization program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the query optimization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the query optimization program 110a, 110b (respectively) to create a machine learning model to approximate a multivariate cumulative frequency function (CFF) of relations to accurately predict the cardinality for query predicates. The query optimization method is explained in more detail below with respect to FIGS. 2 and 3.

Figure 2:
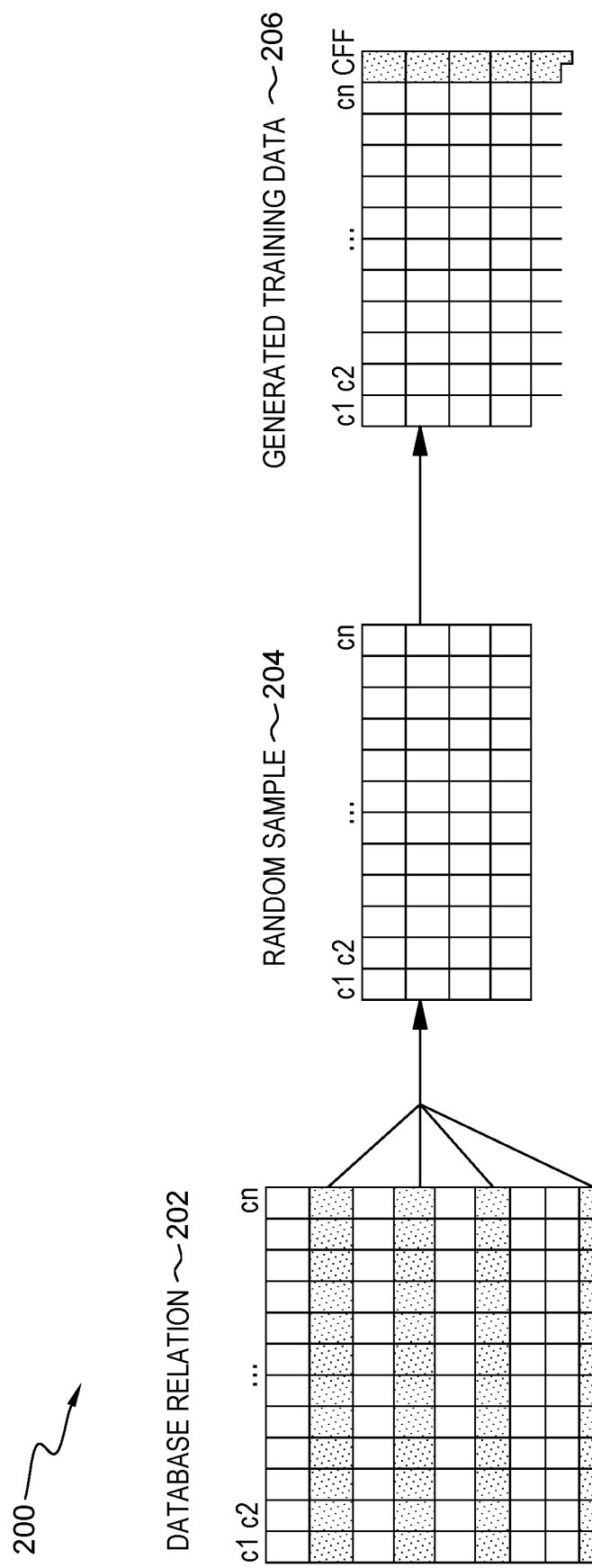
FIG. 2 is a block diagram example of sampling and training data generation for model training according to at least one embodiment.

Referring now to FIG. 2, a block diagram illustrating an example of sampling and training data generation for model training used by the query optimization program 110a, 110b according to at least one embodiment is depicted. Database relation 202 may include a database that contains values in rows and columns, such as a structured data or a structured set of data values. The database relation 202 may have a specified number of rows and columns. The database relation 202 may be scanned for a process to obtain a random sample 204 to generate all or parts of the column combinations in the database relation 202. The random sample 204 of data may include data that is used to generate training data 206 for a machine learning model. A randomly collected sample of relations may be used to train a model. The random sample 204 may be selected without requiring knowledge of how the queries are to be performed in order to build a prediction model.

Figure 3:
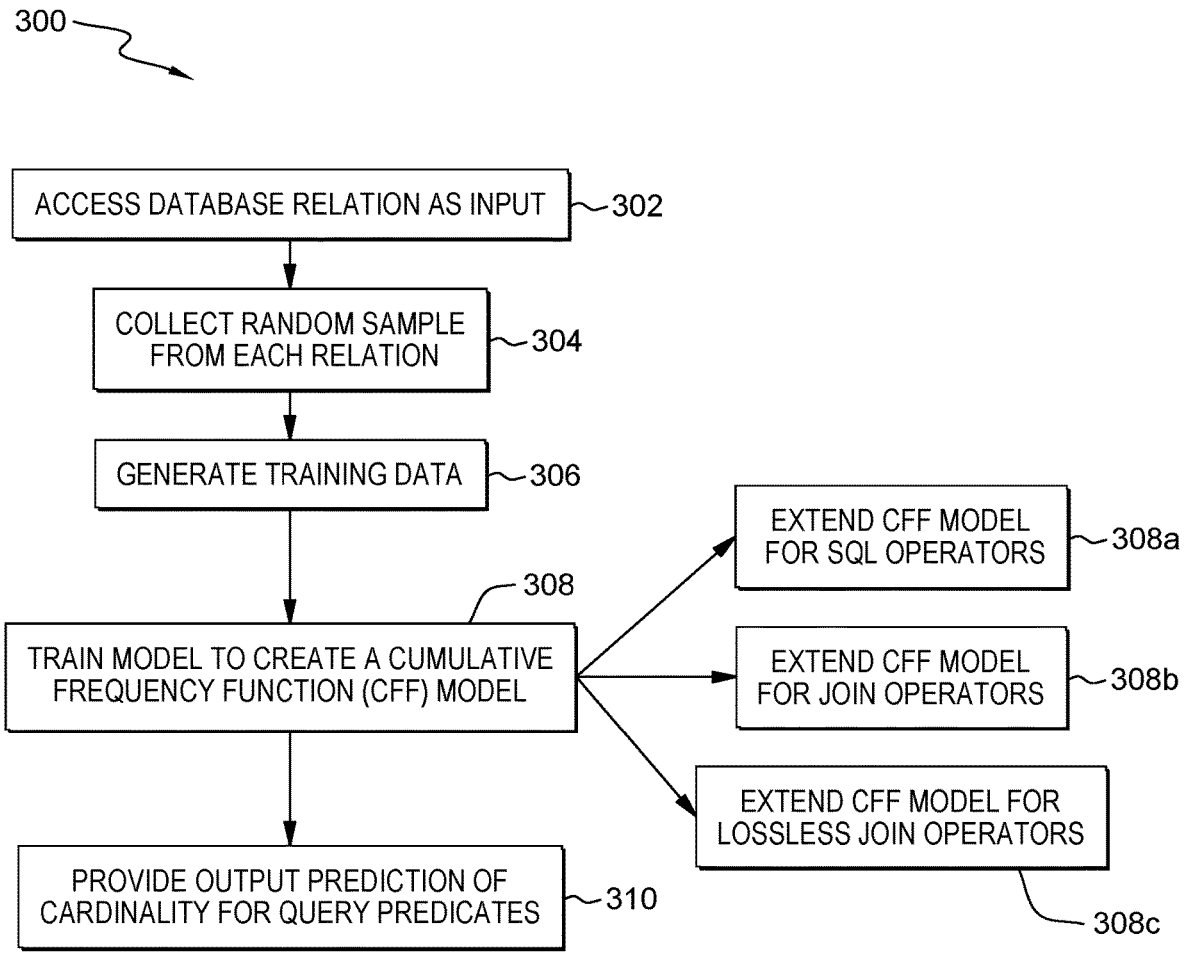
FIG. 3 is an operational flowchart illustrating a process for using an adaptive method for automated query predicate selectivity predictions using machine learning models according to at least one embodiment.

Referring now to FIG. 3, an operational flowchart illustrating the exemplary adaptive method for an automated query selectivity predictions process 300 used by the query optimization program 110a, 110b according to at least one embodiment is depicted.

At 302, a database relation 202 is accessed as an input. The database relation 202 that is accessed may be of varying sizes from a small relation to a large relation. The database relation 202 that is accessed and collected may, for example, contain a sample 10,000 rows. The sample of 10,000 rows may be considered a smaller sample and the sample may be obtained from a much larger amount of relational data. Data may be collected for a relation R with n columns, $c_1, c_2, \ldots, c_n$. For simplicity purposes and as an example, the data accessed and prepared for a single relation, relation R, with two columns ($c_1$ and $c_2$) and the values of each column is provided in Table 1.

TABLE 1

| Row # | $c_1$ | $c_2$ |
|---|---|---|
| 1 | 2.0 | 5.0 |
| 2 | 3.0 | 6.0 |
| 3 | 2.0 | 5.0 |

Data in a relation may also be or also include character data, thus, the relation data may include numerical data, character data, or both. Data in a relation may also include date data, time data and special types of data such as Boolean data. If the data in the relation is character data types or contains character data types, then the data in the relation may be encoded into a numerical form.

At 304, a random sample 204 of each relation is collected. A random sample 204 may be identified and collected, for example, in large relations that contain a large amount of data point combinations that can be used as training data or to train a model. The database relation 202 may be scanned and samples collected may include generating all or parts of the column combinations. For example, if the database relation 202 consists of one million (1,000,000) rows for a given relation R, the random sample may include a 2,000-row random sample or a reservoir sample for each relation during the process of collecting statistics or values. The random sampling 204 process may be used for training the model and the training data may not be required to be stored or kept for a model to make continuous cardinality predictions. The training data may also be stored if required for some models or model training.

In an alternate embodiment, non-random sampling techniques may be used. For example, every $10^{th}$ row in the table may be chosen for sampling or 2 rows from every $20^{th}$ page in the table may be chosen for sampling.

At 306, training data is generated. Training data may be generated by using the number of columns represented as a vector with a regression model. The training data may use the number of columns represented as a vector with the values from the random sample to represent the predicates. A desired or optimal output for the training data may be obtained by computing or determining the selectivity from the sample data. An input into the regression model may include values for each column, and the values may represent, for example, the upper bound (i.e., <=). The output from the regression model may include the selectivity, for example, a relative number that if multiplied with the size of the table will produce the cardinality that represents the number of qualifying rows. The selectivity of a predicate or the selectivity of combined predicates may represent a statistical correlation of the columns that are represented as a vector. The selectivity may be a statistical analysis that uses a cardinality value that was collected from the columns.

For example, the input to a regression model is a vector of length c, where c is the number of columns in the relation. Training data points may present any number of predicates. For columns that do not have predicates, the max value of the column may be used. For example, consider a table with 3 columns, $c_1$, $c_2$ and $c_3$, a data point that presents $c_1 \leq v_1$ and $c_3 \leq v_3$ can be expressed by $c_1 \leq v_1$ and $c_2 \leq \max(c_2)$ and $c_3 \leq v_3$, where $\max(c_2)$ is the maximum value in the second column. Data points may be generated randomly, may be generated by considering all of the combinations of values in the relation or may be generated by considering some or part of the combinations of values in the relation. Data points may be labeled by finding the cumulative frequency function (CFF) frequency point (e.g., the CFF column in the generated training data 206) as the total number of rows that satisfy the predicates represented in the data point divided by the number of rows in the relation.

Training data 206 may be generated by calculating a n-dimensional joint cumulative frequency function (CFF) $F(p_1, p_2, \ldots p_n)$ for the row or for each row (e.g., rows 1-3 in Table 1) or for each row in the random sampling from step 304. The cumulative frequency function (CFF) may be defined as, for example, a non-decreasing and right-continuous function that is practical for the model to learn and approximate.

Other models in addition to a regression model may be used to build on a single relation or on multiple relations and the other models used may depend on the number of columns used as training data. A single model may be built, or multiple models may be built.

At 308, a model is trained to create a cumulative frequency function (CFF) model. A cumulative frequency function (CFF) model may take a vector of values created in step 306 that represent the predicates and the model may be created to predict the selectivity of each query predicate. A cumulative frequency function (CFF) model may be created or generated using inequality predicates, for example, predicates with an ≤ operator. Other types of predicates will be provided as alternate embodiments. The cumulative frequency function (CFF) model may be built or generated by formulating the problem as a regression problem that can be used with a regression model to solve the regression problem. Data in a relation may be converted into a floating-point representation that may allow handling of character data types as well, in addition to number value data types. Many encoding techniques may be used for the conversion process. Additionally, for categorical values, a mapping table may be used to a set of ordinal numbers.

The cumulative frequency function (CFF) may identify the frequency of occurrence of values in a relation that are less than a reference value. Consider relation R with N columns, $c_1, c_2, \ldots c_n$ The cumulative frequency function (CFF) of R is defined as follows:

$$F(p_1, p_2, \ldots p_n) = \text{freq}(c_1 \leq v_1, c_2 \leq v_2, \ldots c_n \leq v_n)$$

where $(p_1, p_2, \ldots p_n)$ is the set of predicates corresponding to a set of values $(v_1, v_2, \ldots v_n)$ that are used with the operator ≤ on the set of columns $(c_1, c_2, \ldots c_n)$ expressed as $c_1 \leq v_1$ AND $c_2 \leq v_2, \ldots$ AND $c_n \leq v_n$. Here freq($c_1 \leq v_1$, $c_2 \leq v_2, \ldots c_n \leq v_n$) is the number of rows in the relation that satisfy the set of predicates $c_1 \leq v_1$ AND $c_2 \leq v_2, \ldots$ AND $c_n \leq v_n$ to the total number of rows in the relation.

According to an alternate embodiment, 308a, the functionality of the built cumulative frequency function (CFF) model may be extended for estimating the cardinality of additional structured query language (SQL) operators, such as operators for equality predicates. In structured query language (SQL) form, the cumulative frequency function (CFF) can be expressed as follows:

$$F(p_1, p_2, \ldots p_n) = \frac{(\text{select count}(*) \text{ from } R \text{ where } c_1 \leq v_1 \text{ AND } c_2 \leq v_2, \ldots \text{ AND } c_n \leq v_n)}{(\text{select count}(*) \text{ from } R)}$$

The functionality of the built cumulative frequency function (CFF) model may be extended for predicting additional SQL operators, such as equality and BETWEEN predicates. Since the cumulative frequency function (CFF) model built at step 308 is trained on joint operators (e.g., the cumulative frequency function (CFF) model at 308 may not directly predict other predicate types. Other predicate types may be rewritten in terms of the ≤predicate in order to calculate or to compute the selectivity.

To achieve better cardinality estimates for equality predicates, extra training points may be generated by including a small constant number δ. For example, for a data point [$p_1$, $p_2$, $p_3$], an extra point [$p_1-\delta$, $p_2-\delta$, $p_3-\delta$] may be generated or other combinations with max values may be generated, such as [$p_1-\delta$, max($c_2$), max($c_3$)], [max($c_1$), $p_2-\delta$, max($c_3$)], [$p_1-\delta$, $p_2-\delta$, max($c_3$)].

An example of training data for the cumulative frequency function (CFF) model (e.g., a regression model) for the data provided in Table 1 is provided in Table 2, where δ=0.1.

TABLE 2

| Input | Label (Selectivity) | Note |
| --- | --- | --- |
| (2.0, 5.0) | 1 | $c_1 \leq 2.0$ and $c_2 \leq 5.0$ |
| (1.9, 5.0) | 1 | $c_1 \leq 2.0 - \delta$ and $c_2 \leq 5.0$ |
| (2.0, 4.9) | 1 | $c_1 \leq 2.0$ and $c_2 \leq 5.0 - \delta$ |
| (1.9, 4.9) | 1 | $c_1 \leq 2.0 - \delta$ and $c_2 \leq 5.0 - \delta$ |
| (2.0, 6.0) | 0.33333333 | $c_1 \leq 2.0$ and $c_2 \leq 6.0$ |
| (1.9, 6.0) | 0.33333333 | $c_1 \leq 2.0 - \delta$ and $c_2 \leq 6.0$ |
| (2.0, 5.9) | 0.33333333 | $c_1 \leq 2.0$ and $c_2 \leq 6.0 - \delta$ |
| (1.9, 5.9) | 0.33333333 | $c_1 \leq 2.0 - \delta$ and $c_2 \leq 6.0 - \delta$ |
| (3.0, 5.0) | 0.33333333 | $c_1 \leq 3.0$ and $c_2 \leq 5.0$ |
| (2.9, 5.0) | 0.33333333 | $c_1 \leq 3.0 - \delta$ and $c_2 \leq 5.0$ |
| (3.0, 4.9) | 0.33333333 | $c_1 \leq 3.0$ and $c_2 \leq 5.0 - \delta$ |
| (2.9, 4.9) | 0.33333333 | $c_1 \leq 3.0 - \delta$ and $c_2 \leq 5.0 - \delta$ |
| (3.0, 6.0) | 0.33333333 | $c_1 \leq 3.0$ and $c_2 \leq 6.0$ |
| (2.9, 6.0) | 0.33333333 | $c_1 \leq 3.0 - \delta$ and $c_2 \leq 6.0$ |
| (3.0, 5.9) | 0.33333333 | $c_1 \leq 3.0$ and $c_2 \leq 6.0 - \delta$ |
| (2.9, 5.9) | 0.33333333 | $c_1 \leq 3.0 - \delta$ and $c_2 \leq 6.0 - \delta$ |

Extending a cumulative frequency function (CFF) model for other predicate types may be shown, for example, in Table 3.

TABLE 3

| Predicate Type | Example | Re-written as less than or equal predicates |
| --- | --- | --- |
| = | $c_1 = v_1$ | freq($c_1 \leq v_1$) − freq($c_1 \leq v_1 - \delta$) |
| < | $c_1 < v_1$ | freq($c_1 \leq v_1 - \delta$) |
| > | $c_1 > v_1$ | 1 − freq($c_1 \leq v_1$) |
| ≥ | $c_1 \geq v_1$ | 1 − freq($c_1 \leq v_1 - \delta$) |
| Between | $v_1 \leq c_1 \leq v_2$ | freq($c_1 \leq v_2$) − freq($c_1 \leq v_1 - \delta$) |

According to an alternate embodiment, 308a, the built cumulative frequency function (CFF) model may be extended for estimating the cardinality of SQL operators with more complex predicates, such as IN, OR and NOT predicates. The more complex predicates, such as IN, OR and NOT predicates may consist of one or more subterms that are processed or calculated by deriving the selectivity from the selectivities of the basic components applied to the cumulative frequency function (CFF) model created in step 308. For example, basic components of the cumulative frequency function (CFF) of relation R are described above as $F(p_1, p_2, \ldots p_n) = \text{freq}(c_1 \leq v_1, c_2 \leq v_2, \ldots c_n \leq v_n)$.

An example of applying basic components to the more complex predicates (e.g., IN, OR and NOT) may apply $$F((p_1 \text{ and } p_2) \text{OR}(p_3 \text{ and } p_4)) = F(p_1 \text{ and } p_2) + F(p_3 \text{ and } p_4) - F(p_1 \text{ and } p_2) * F(p_3 \text{ and } p_4))$$

to the NOT predicate as $$F(NOT(p_1)) = (1 - F(p_1))$$

and the OR predicate as $$F((c_1 = 10) \text{ OR}(c_1 = 20) \text{ OR}(c_1 = 50)) = F(c_1 = 10) + F(c_1 = 20) + F(c_1 = 50)$$

and the IN predicate as $$F(c_1 IN(10, 20, 50)) = F(c_1 = 10) + F(c_1 = 20) + F(c_1 = 50).$$

The complex predicates may also be considered in combination with multiple basic and complex predicates expressed as follows:

$F(c_1 IN(10, 20, 50)$ and $p_1 =$ $F(c_1 = 10$ and $p_1) + F(c_1 = 20$ and $p_1) + F(c_1 = 50$ and $p_1)$;

or $F(p_1$ and $(c_1 = 10$ or $c_1 = 20$ or $c_1 = 30) =$ $F(c_1 = 10$ and $p_1) + F(c_1 = 20$ and $p_1) + F(c_1 = 30$ and $p_1)$;

or $F(c_1 IN(10, 20, 50)$ and $c_2$ in $('A',' B',' C')$ and $p_1$ and $p_2 =$ $F(c_1 = 10$ and $c_2 =' A'$ and $p_1$ and $p_2) +$ $F(c_1 = 10$ and $c_2 =' B'$ and $p_1$ and $p_2) +$ $F(c_1 = 10$ and $c_2 =' C'$ and $p_1$ and $p_2) + F(c_1 = 20$ and $c_2 =' A'$ and $p_1$ and $p_2) +$ $F(c_1 = 20$ and $c_2 =' B'$ and $p_1$ and $p_2) +$ $F(c_1 = 20$ and $c_2 =' C'$ and $p_1$ and $p_2) + F(c_1 = 30$ and $c_2 =' A'$ and $p_1$ and $p_2) +$ $F(c_1 = 30$ and $c_2 =' B'$ and $p_1$ and $p_2) +$ $F(c_1 = 30$ and $c_2 =' C'$ and $p_1$ and $p_2)$.

Each set of inferences may be computed in a single batch to minimize the overhead of computing multiple inferences for the complex scenarios. Computing each batch of inferences in a single batch minimizes the call back and forth (i.e., called inference calls) to the cumulative frequency function (CFF) model, thus results in a reduced time to perform the computation.

According to an alternate embodiment, 308b, the built cumulative frequency function (CFF) model may be extended by estimating the cardinality applied to joins. A single table model may be stored to capture a distribution of non-join columns. A join distribution may be estimated using the top frequent values of each join column determined using the column probability density function (PDF). The probability density function (PDF) may be used for the extension of the cumulative frequency function (CFF) model to joins. For example, an estimation of the join distribution may include a calculation of the selectivity of the binary combination with the non-join column(s) for every value in the results of a join. For instance, assume there are two tables, $T1(c_1, c_2, c_3, c_4)$ and $T2(c_1, c_2, c_5, c_6)$ where $c_1$ is the join column and $c_2$ represents the non-join column. The selectivity=length($T1(c_1)$==$T1T2(c_1)$ and $T1(c_2)$==$T1T2(c_2)$). The selectivity values are the values that are computed and predicted using the built cumulative frequency function (CFF) model.

Each selectivity is multiplied by the frequency of that specific value. The results may be an array containing every value of $c_2$ in T1 with the change value of all $c_1$ after the join. The distribution of two non-join columns may be captured in similar steps or may be captured as the distribution of n-way joins. The $c_2$ selectivities may be used to build up the forward join operation on $c_2$ with another table or with multiple other tables.

A traditional implementation of using statistical views to improve the estimated join cardinality may use a relational database management system (RDBMS) to leverage multi-column statistics and statistics collected on a materialized query table (MQT). An example of a relational database management system (RDBMS) may include IBM® DB2® (IBM® (IBM DB2 and all IBM DB2—based trademarks and logos are trademarks or registered trademarks of International Business Machines Corporation and/or its affiliates). The multi-column statistics may be stored and may provide the number of distinct groupings for a set of values. The number of distinct groupings may be used to account for a correlation between multiple equality join predicates applied to each pair of joins, such as T1 JOIN T2 ON T1.A=T2.A AND T1.B=T2.b.

The built cumulative frequency function (CFF) model may provide additional benefits for pair-wise joins since the cumulative frequency function (CFF) model may be used to account for correlation with any local predicates that are applied to the tables that are participating in the join. Local predicates may include, for example, range predicates and predicates with expressions. The use of multi-columns statistics may assume uniformity across the full domain of values which may not be the case for a model that results in a reduced error in the estimate.

According to an alternate embodiment, 308c, the built cumulative frequency function (CFF) model may be extended by estimating the cardinality of lossless joins. A lossless join predicate may, for example, include a star schema. A single model may be defined on all tables in the schema if an enforced or discovered constraint exists between the tables. A single model may also be defined on the sets of stars in the schema.

A model may be built for each of the stars and an optimizer may use or leverage the models to estimate the cardinality for any permutation of joins covered by them. For example, consider a schema that contains a fact table, F, and a set of dimension tables $\{D_1, D_2, \ldots, D_n\}$. If each join between the fact and dimension Di is lossless, then a model may be built on the join of fact table F with all dimension tables. The prediction for a subset of columns or tables covered by the model may be computed by setting the inputs to the max value for each column that is not participating in the join.

At 310, a prediction of the cardinality for a query predicate is provided as an output. The built cumulative frequency function (CFF) model may provide a cardinality estimation that is not required to be stored, although it may be stored. Although data may be stored, the training data nor the cardinality estimation may not be required to be stored or kept for a model to make continuous cardinality predictions.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
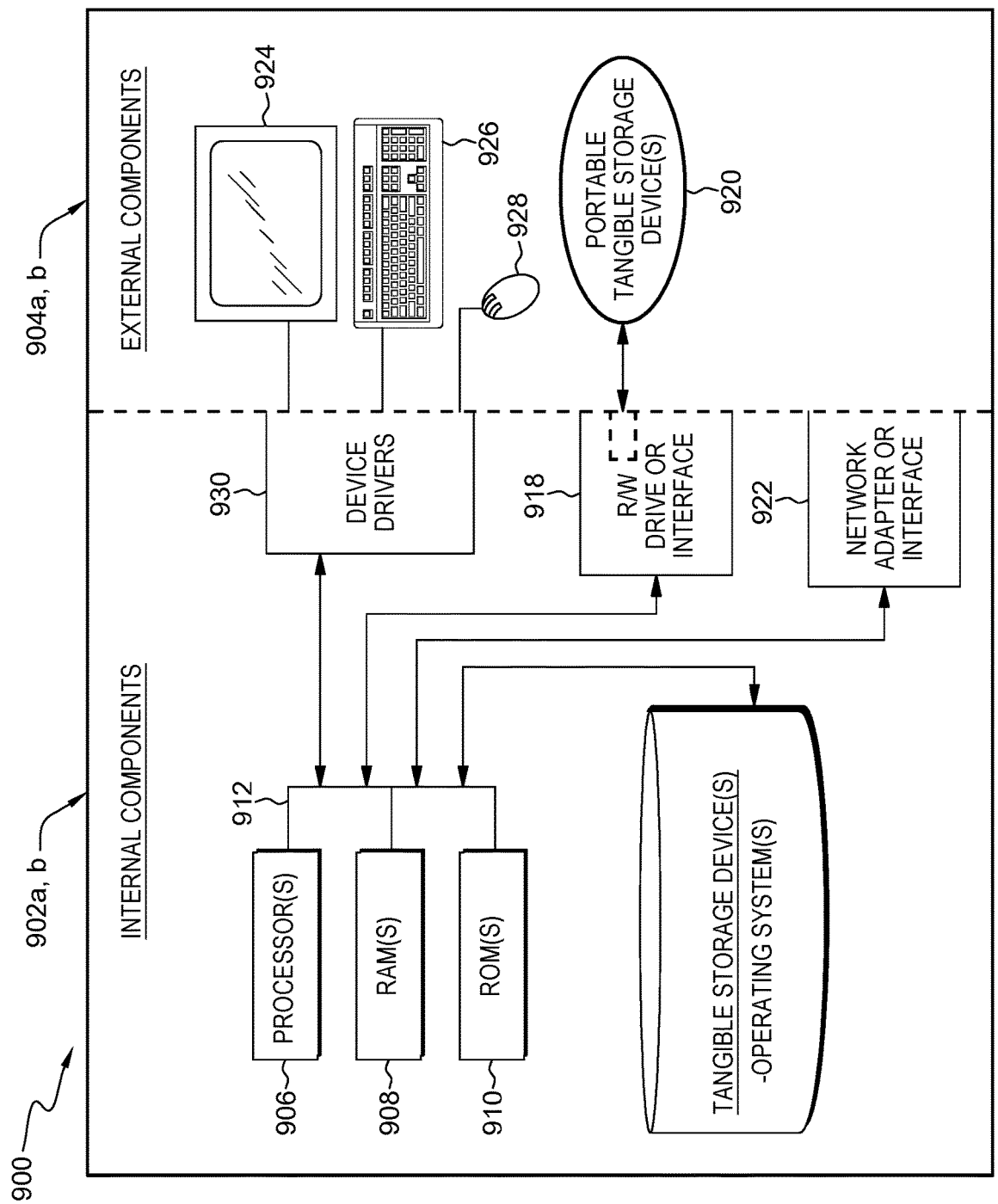
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the query optimization program 110a in client computer 102, and the query optimization program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the query optimization program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the query optimization program 110a in client computer 102 and the query optimization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the query optimization program 110a in client computer 102 and the query optimization program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
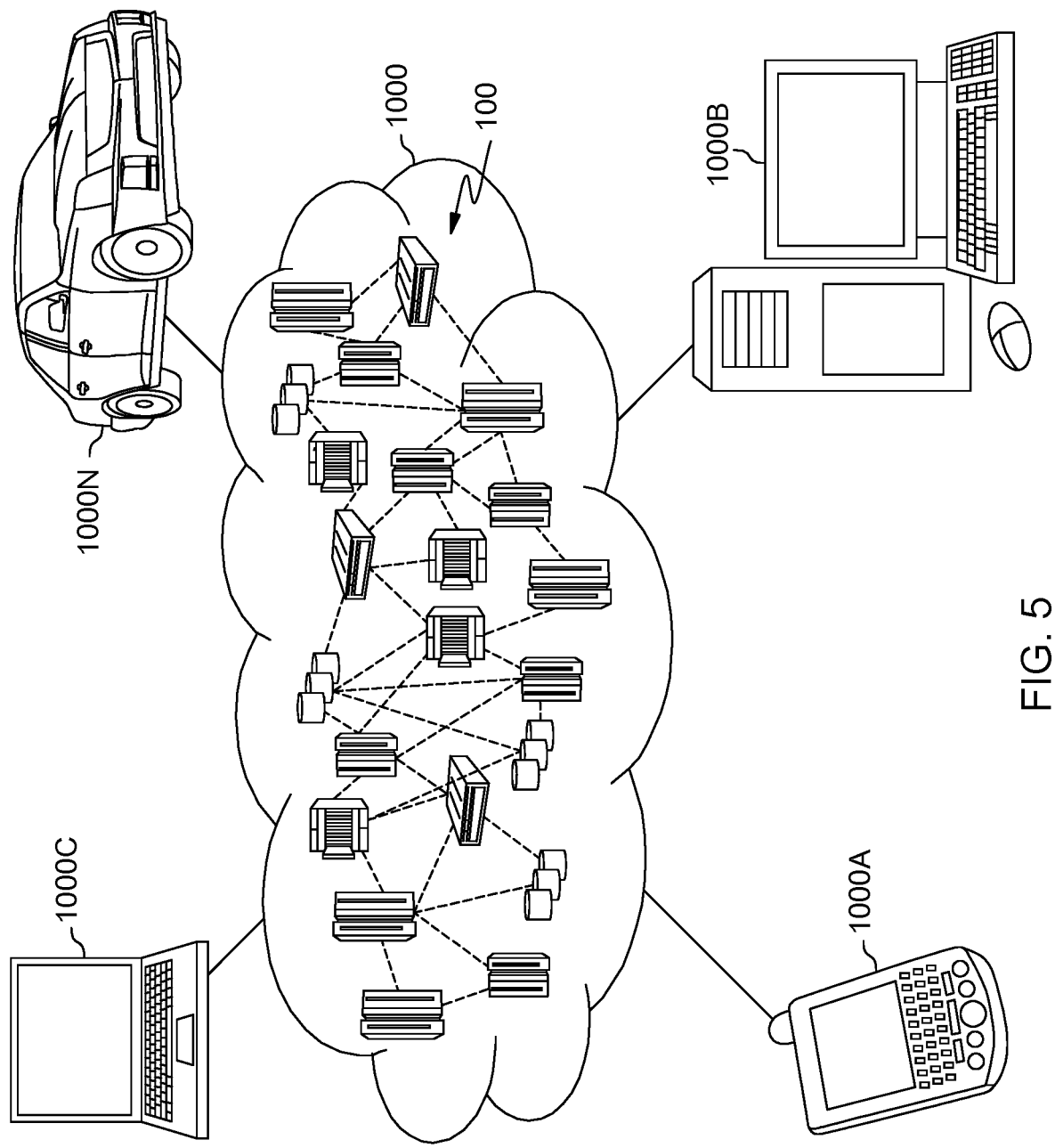
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
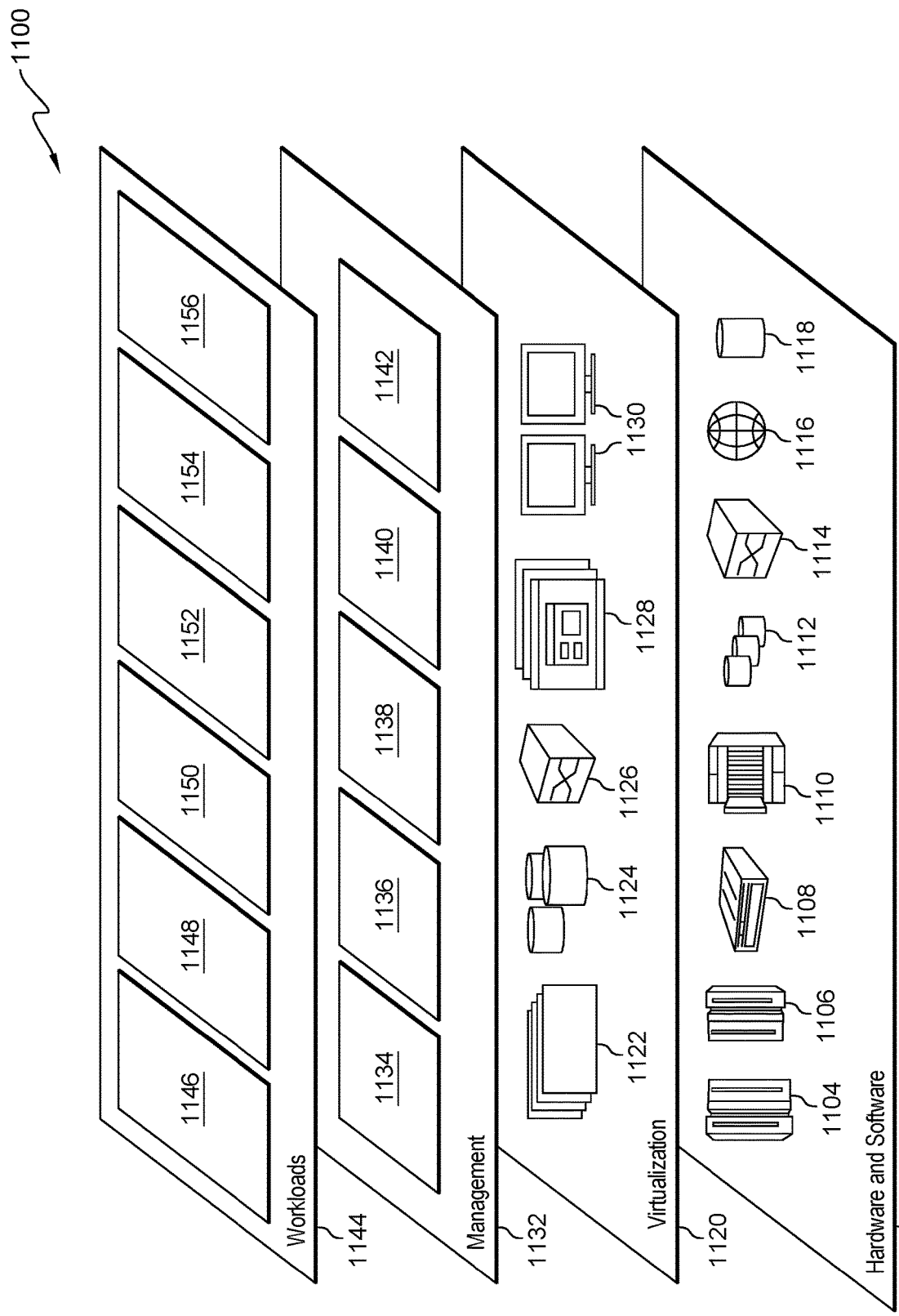
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and query optimization 1156. A query optimization program 110a, 110b provides a way to predict cardinality estimation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for cardinality estimation using machine learning, the method comprising:
   accessing database relations;
   collecting a random sample from each of the database relations;
   generating training data for creating a cumulative frequency function (CFF) model from the random sample collected from each of the database relations, the cumulative frequency function (CFF) model predicted using a machine learning model;
   creating the cumulative frequency function (CFF) model from the generated training data using the machine learning model; and
   predicting a cardinality estimation of a plurality of structured query language (SQL) predicates, the cardinality estimation based upon the cumulative frequency function (CFF) model.

2. The method of claim 1, further comprising:
   extending the cumulative frequency function (CFF) model to predict a cardinality estimation of some of the plurality of structured query language (SQL) predicates, wherein the some of the plurality of structured query language (SQL) predicates are equality predicates.

3. The method of claim 1, further comprising:
   extending the cumulative frequency function (CFF) model to predict a cardinality estimation of join predicates.

4. The method of claim 1, further comprising:
   extending the cumulative frequency function (CFF) model to predict a cardinality estimation of lossless join predicates.

5. The method of claim 1, wherein some of the plurality of structured query language (SQL) operators are inequality predicates.

6. The method of claim 1, wherein the training data is generated by using a number of columns represented as a vector with values from the random sample.

7. The method of claim 6, wherein the values from the random sample represent predicates and an optimal output for the training data, wherein the optimal output for the training data is obtained by computing the selectivity from the random sample.

8. The method of claim 1, wherein the cumulative frequency function (CFF) model determines a selectivity of each query predicate.

9. The method of claim 1, wherein the database relations include numerical data and character data.

10. The method of claim 1, wherein the random sample is associated with all or part of the column combinations in the database relations.

11. A computer system for cardinality estimation, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    accessing database relations;
    collecting a random sample from each of the database relations;
    generating training data for creating a cumulative frequency function (CFF) model from the random sample of each of the database relations, the cumulative frequency function (CFF) model predicted using a machine learning model;
    creating a cumulative frequency function (CFF) model from the generated training data using the machine learning model; and
    predicting a cardinality estimation of a plurality of structured query language (SQL) predicates, the cardinality estimation based upon the cumulative frequency function (CFF) model.

12. The computer system of claim 11, further comprising:
    extending the cumulative frequency function (CFF) model to predict a cardinality estimation of some of the plurality of structured query language (SQL) predicates, wherein the some of the plurality of structured query language (SQL) predicates are equality predicates.

13. The computer system of claim 11, further comprising:
    extending the cumulative frequency function (CFF) model to predict a cardinality estimation of join predicates.

14. The computer system of claim 11, further comprising:
    extending the cumulative frequency function (CFF) model to predict a cardinality estimation of lossless join predicates.

15. The computer system of claim 11, wherein some of the plurality of structured query language (SQL) operators are inequality predicates.

16. The computer system of claim 11, wherein the training data is generated by using a number of columns represented as a vector with values from the random sample.

17. The computer system of claim 16, wherein the values from the random sample represent predicates and an optimal output for the training data, wherein the optimal output for the training data is obtained by computing the selectivity from the random sample.

18. The computer system of claim 11, wherein the cumulative frequency function (CFF) model determines a selectivity of each query predicate.

19. The computer system of claim 11, wherein the database relations include numerical data and character data.

20. A computer program product for cardinality estimation, comprising:
    one or more computer-readable storage media and program instructions stored on at least one of the one or more computer-readable storage media, the program instructions executable by a processor to cause the processor to perform a method comprising:
    accessing database relations;
    collecting a random sample from each of the database relations;
    generating training data for creating a cumulative frequency function (CFF) model from the random sample of each of the database relations, the cumulative frequency function (CFF) model predicted using a machine learning model;
    creating a cumulative frequency function (CFF) model from the generated training data using the machine learning model; and
    predicting a cardinality estimation of a plurality of structured query language (SQL) predicates, the cardinality estimation based upon the cumulative frequency function (CFF) model.

21. The computer program product of claim 20, further comprising:
    extending the cumulative frequency function (CFF) model to predict a cardinality estimation of some of the plurality of structured query language (SQL) predicates, wherein the some of the plurality of structured query language (SQL) predicates are equality predicates.

22. The computer program product of claim 20, further comprising:
extending the cumulative frequency function (CFF) model to predict a cardinality estimation of join predicates.

23. The computer program product of claim 20, further comprising:
extending the cumulative frequency function (CFF) model to predict a cardinality estimation of lossless join predicates.

24. The computer program product of claim 20, wherein some of the plurality of structured query language (SQL) operators are inequality predicates.

25. The computer program product of claim 20, wherein the training data is generated by using a number of columns represented as a vector with values from the random sample.

26. The computer program product of claim 20, wherein the values from the random sample represent predicates and an optimal output for the training data, wherein the optimal output for the training data is obtained by computing the selectivity from the random sample.

* * * * *